United States Patent
Matsumoto et al.

(10) Patent No.: US 9,073,437 B2
(45) Date of Patent: Jul. 7, 2015

(54) DEVICE AND METHOD FOR CONTROLLING RECHARGEABLE BATTERY, INCLUDING WARNING A USER TO SUBJECT THE RECHARGEABLE BATTERY TO A DIAGNOSIS

(75) Inventors: Junichi Matsumoto, Toyota (JP); Keiji Kaita, Miyoshi (JP); Takayoshi Tezuka, Nissin (JP); Teruo Ishishita, Miyoshi (JP)

(73) Assignee: TOYOTA JIDOSHA KABUSHIKI KAISHA, Toyota (JP)

(*) Notice: Subject to any disclaimer, the term of this patent is extended or adjusted under 35 U.S.C. 154(b) by 307 days.

(21) Appl. No.: 13/640,582

(22) PCT Filed: May 14, 2010

(86) PCT No.: PCT/JP2010/058160
§ 371 (c)(1),
(2), (4) Date: Oct. 11, 2012

(87) PCT Pub. No.: WO2011/142023
PCT Pub. Date: Nov. 17, 2011

(65) Prior Publication Data
US 2013/0049973 A1    Feb. 28, 2013

(51) Int. Cl.
*G08B 21/00* (2006.01)
*B60L 11/14* (2006.01)
(Continued)

(52) U.S. Cl.
CPC .............. *B60L 11/14* (2013.01); *B60L 3/0046* (2013.01); *B60L 3/04* (2013.01); *B60L 11/123* (2013.01); *B60L 11/1857* (2013.01); *B60L 11/1861* (2013.01); *B60L 2250/16* (2013.01); *H01M 10/48* (2013.01); *H02J 7/027* (2013.01);

*Y02T 10/6217* (2013.01); *Y02T 10/7005* (2013.01); *Y02T 10/7011* (2013.01);
(Continued)

(58) Field of Classification Search
CPC ........... G01R 31/3662; G01R 31/3679; G01R 31/3655
USPC ......................................................... 702/63
See application file for complete search history.

(56) References Cited

U.S. PATENT DOCUMENTS 7,482,779 B2    1/2009  Suzuki
7,521,935 B2    4/2009  Uchida
(Continued)

FOREIGN PATENT DOCUMENTS

JP    A-8-227731    9/1996
JP    A-11-219732    8/1999
(Continued)

*Primary Examiner* — Mark Rushing
(74) *Attorney, Agent, or Firm* — Oliff PLC

(57) ABSTRACT

The calculation unit converts into a battery age each parameter calculated for a different factor of degradation of a battery. If at least one of the battery ages has reached an upper limit age, the determination unit determines that it is necessary to conduct a battery diagnosis. Once it has been determined that it is necessary to conduct the battery diagnosis, the display control unit causes a display device to display a diagnosis request message. After displaying the diagnosis request message has started if there is no result of the battery diagnosis received the electric power limiter unit limits electric power charged to and discharged from the battery. After the electric power charged to/discharged from the battery is limited if there is no result of the battery diagnosis received the start-up prohibition unit prohibits starting a system driving the vehicle.

15 Claims, 14 Drawing Sheets

(51) Int. Cl.
*B60L 3/00* (2006.01)
*B60L 3/04* (2006.01)
*B60L 11/12* (2006.01)
*B60L 11/18* (2006.01)
*H01M 10/48* (2006.01)
*H02J 7/02* (2006.01)
*B60L 15/20* (2006.01)
*H02J 7/00* (2006.01)

(52) U.S. Cl.
CPC ........... *Y02T 10/7044* (2013.01); *Y02T 10/705* (2013.01); *Y02T 10/7077* (2013.01); *B60L 15/20* (2013.01); *B60L 2210/40* (2013.01); *B60L 2240/421* (2013.01); *B60L 2240/423* (2013.01); *B60L 2240/545* (2013.01); *B60L 2240/547* (2013.01); *B60L 2240/549* (2013.01); *B60L 2240/80* (2013.01); *B60L 2250/10* (2013.01); *H02J 7/0026* (2013.01); *Y02T 10/7241* (2013.01); *Y02T 10/642* (2013.01); *Y02T 10/7055* (2013.01); *Y02T 10/7275* (2013.01)

(56) References Cited

U.S. PATENT DOCUMENTS

| | | | |
|---|---|---|---|
| 2003/0054229 A1 | 3/2003 | Odaohhara et al. | |
| 2004/0178770 A1 | 9/2004 | Gagnon et al. | |
| 2004/0232884 A1 | 11/2004 | Vaillancourt et al. | |
| 2005/0083017 A1* | 4/2005 | Suzuki | 320/128 |
| 2006/0028172 A1 | 2/2006 | Vaillancourt et al. | |
| 2006/0152224 A1 | 7/2006 | Kim et al. | |
| 2007/0029974 A1* | 2/2007 | Uchida | 320/132 |
| 2009/0309745 A1* | 12/2009 | Johnson | 340/635 |
| 2010/0076706 A1 | 3/2010 | Elder et al. | |
| 2011/0231122 A1* | 9/2011 | Fabregas et al. | 702/63 |
| 2011/0270544 A1* | 11/2011 | Kucera et al. | 702/58 |

FOREIGN PATENT DOCUMENTS

| | | |
|---|---|---|
| JP | A-2001-136666 | 5/2001 |
| JP | A-2003-9405 | 1/2003 |
| JP | A-2003-92838 | 3/2003 |
| JP | A-2004-532416 | 10/2004 |
| JP | A-2005-124353 | 5/2005 |
| JP | A-2005-249582 | 9/2005 |
| JP | A-2006-197765 | 7/2006 |
| JP | A-2006-524332 | 10/2006 |
| JP | A-2007-74891 | 3/2007 |
| JP | A-2009-33924 | 2/2009 |
| JP | A-2009-58518 | 3/2009 |
| JP | A-2009-199936 | 9/2009 |
| JP | A-2010-19653 | 1/2010 |

* cited by examiner

DEVICE AND METHOD FOR CONTROLLING RECHARGEABLE BATTERY, INCLUDING WARNING A USER TO SUBJECT THE RECHARGEABLE BATTERY TO A DIAGNOSIS

TECHNICAL FIELD

The present invention relates to controlling a rechargeable battery which can be diagnosed via a diagnostic device for whether the battery has a degraded state.

BACKGROUND ART

In recent years, electrically powered vehicles (hybrid vehicles, electric vehicles, and the like) that obtain driving force through electric power are gaining a large attention. An electrically powered vehicle is generally equipped with a rechargeable battery to store electric power therein for driving a motor. The rechargeable battery degrades with time, and if it continues to be used in a degraded state, it will fail. Accordingly, for the electrically powered vehicle, it is important to grasp how much the rechargeable battery is degraded. In this regard, Japanese Patent Laying-Open No. 2007-074891 (PTL 1) discloses estimating a battery's lifetime from the battery's history of use and warning the user thereof.

CITATION LIST

Patent Literature

PTL 1: Japanese Patent Laying-Open No. 2007-074891
PTL 2: Japanese Patent Laying-Open No. 2006-197765
PTL 3: Japanese Patent Laying-Open No. 2005-124353
PTL 4: Japanese Patent Laying-Open No. 2009-199936

SUMMARY OF INVENTION

Technical Problem

If the user thus warned of the rechargeable battery's estimated lifetime, as described in PTL 1, nonetheless continues to use the rechargeable battery having a reduced lifetime, the rechargeable battery may fail.

The present invention has been made to overcome the above disadvantage, and it contemplates preventing a rechargeable battery from failing as it continues to be used in a degraded state.

Solution to Problem

The present invention provides a device for controlling a rechargeable battery which can be subjected to a diagnosis of a degraded state by a diagnostic device, including: a determination unit that determines, from a history of how the rechargeable battery has been used, whether it is necessary to conduct the diagnosis; a warning unit that warns the user to subject the rechargeable battery to the diagnosis when the determination unit determines that it is necessary to conduct the diagnosis; and a restriction unit that restricts an output of the rechargeable battery if the warning unit warns the user to subject the rechargeable battery to the diagnosis and thereafter a predetermined period of time elapses, and despite that the diagnosis is still not conducted.

Preferably, the determination unit determines whether it is necessary to conduct the diagnosis for each of a plurality of parameters including at least two of: a period for which the rechargeable battery is used; an integrated value of a period of time for which the rechargeable battery has voltage exceeding a reference value; an integrated value of a portion of a current charged to the rechargeable battery that exceeds a predetermined value; and an integrated value of a current discharged from the rechargeable battery.

Preferably, the determination unit calculates a plurality of battery ages for the plurality of parameters, respectively, the battery age indicating an extent of how the rechargeable battery is degraded, and when at least one of the plurality of battery ages calculated reaches an upper limit age, the determination unit determines that it is necessary to conduct the diagnosis.

Preferably, the device for controlling the rechargeable battery further includes a modification unit that modifies a battery age in accordance with a result of the diagnosis when the diagnosis is conducted.

Preferably, if the result of the diagnosis indicates that the rechargeable battery can continue to be used, the modification unit returns the battery age that has reached the upper limit age to a predetermined age smaller than the upper limit age.

Preferably, if the result of the diagnosis indicates that the rechargeable battery can continue to be used, the modification unit returns the battery age that has reached the upper limit age to the predetermined age, and the modification unit also sets at the predetermined age any other battery age that has not reached the upper limit age.

Preferably, if the result of the diagnosis indicates that the rechargeable battery can continue to be used, and when at least one of the plurality of battery ages is larger than a predetermined age, then the modification unit sets the plurality of battery ages at the predetermined age, whereas if the result of the diagnosis indicates that the rechargeable battery can continue to be used, and when the plurality of battery ages are all smaller than the predetermined age, then the modification unit does not modify the plurality of battery ages.

Preferably, when the result of the diagnosis indicates that the rechargeable battery can no longer continue to be used, the modification unit sets the plurality of battery ages at the upper limit age. When the result of the diagnosis indicates that the rechargeable battery can no longer continue to be used, the warning unit warns the user that the rechargeable battery cannot be used. When the result of the diagnosis indicates that the rechargeable battery can no longer continue to be used, the restriction unit prohibits electrically charging and discharging the rechargeable battery.

Preferably, the restriction unit restricts the output of the rechargeable battery by applying at least any one of a first control applied to decrease an upper limit value of electric power charged to the rechargeable battery and an upper limit value of electric power discharged from the rechargeable battery and a second control applied to prohibit electrically charging and discharging the rechargeable battery.

Preferably, if the determination unit has determined that it is necessary to conduct the diagnosis and thereafter a first period of time elapses, and despite that the diagnosis is still not conducted, then, the restriction unit applies the first control, and if the determination unit has determined that it is necessary to conduct the diagnosis and thereafter a second period of time longer than the first period of time elapses, and despite that the diagnosis is still not conducted, then, the restriction unit applies the second control.

Preferably, the device for controlling the rechargeable battery further includes: a display device that displays information for the user; and an electric power controller that controls electric power charged to and discharged from the rechargeable battery. The warning unit warns the user to subject the rechargeable battery to the diagnosis by causing the display device to display a message to urge the user to subject the rechargeable battery to the diagnosis. The restriction unit restricts the output of the rechargeable battery by controlling the electric power controller.

Preferably, the determination unit determines whether it is necessary to conduct the diagnosis, based on at least one parameter of: a period for which the rechargeable battery is used; an integrated value of a period of time for which the rechargeable battery has voltage exceeding a reference value; an integrated value of a portion of a current charged to the rechargeable battery that exceeds a predetermined value; and an integrated value of a current discharged from the rechargeable battery.

The present invention in another aspect provides a method performed by a device for controlling a rechargeable battery which can be subjected to a diagnosis of a degraded state by a diagnostic device, including the steps of: determining, from a history of how the rechargeable battery has been used, whether it is necessary to conduct the diagnosis; warning the user to subject the rechargeable battery to the diagnosis when it is determined that it is necessary to conduct the diagnosis; and restricting an output of the rechargeable battery if the user has been warned to subject the rechargeable battery to the diagnosis and thereafter a predetermined period of time elapses, and despite that the diagnosis is still not conducted.

Advantageous Effects of Invention

The present invention allows a user to be warned that a rechargeable battery needs to be diagnosed for whether it has a degraded state, and the user to be urged to conduct a diagnosis using a diagnostic device. If in spite of the warning the rechargeable battery is not diagnosed and instead continues to be used, using the rechargeable battery is restricted (i.e., limited or prohibited). This can prevent the rechargeable battery from failing as it continues to be used in a degraded state.

DESCRIPTION OF EMBODIMENTS

Hereinafter reference will be made to the drawings to describe the present invention in embodiments. In the figures, identical or corresponding components are identically denoted and will not be described repeatedly in detail.

Figure 1:
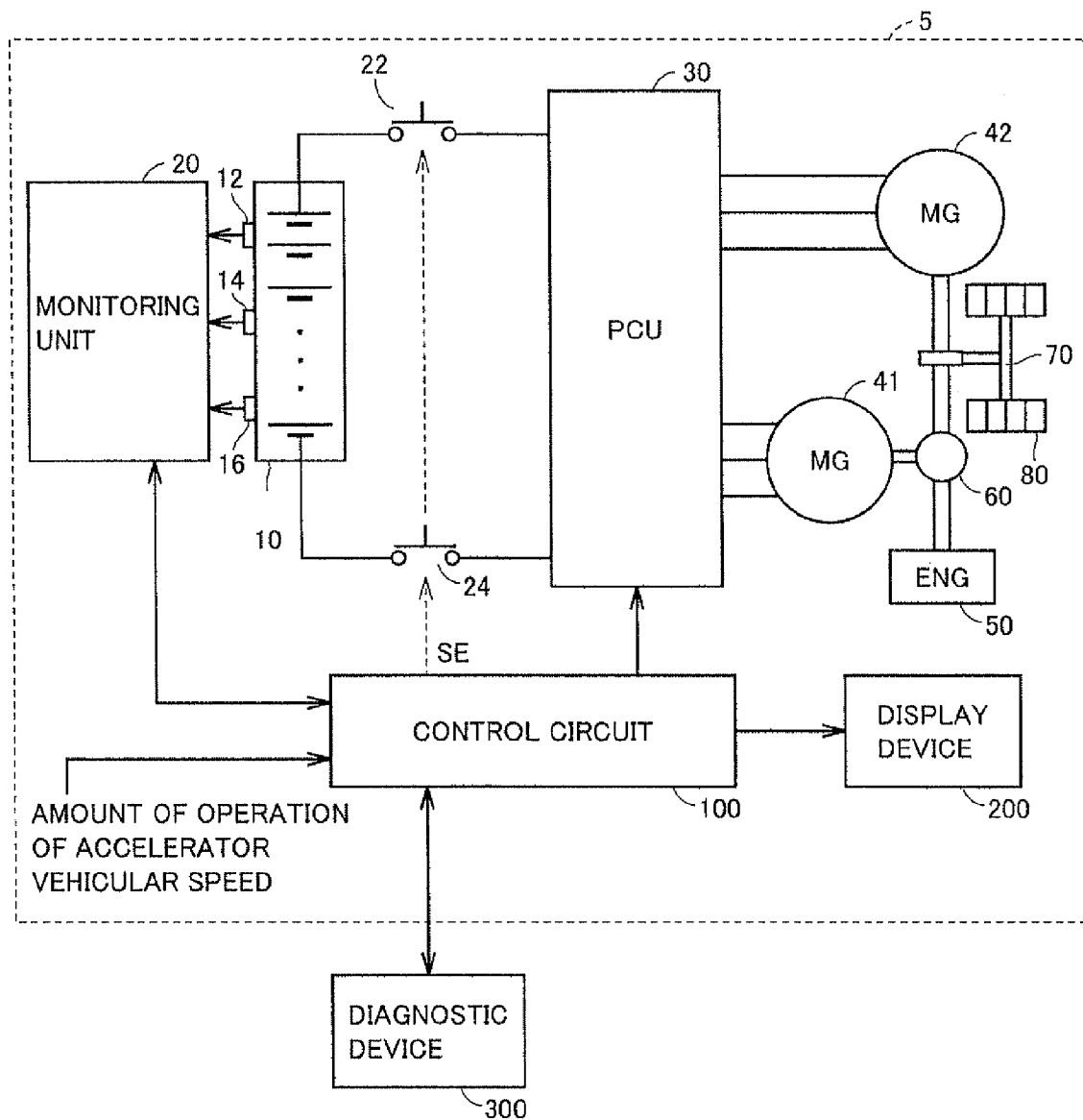
FIG. 1 is a block diagram for schematically illustrating a vehicle in configuration.

FIG. 1 is a block diagram for schematically illustrating a vehicle 5 in configuration with a rechargeable battery control device applied thereto according to an embodiment of the present invention. Note that while the FIG. 1 vehicle 5 is a hybrid vehicle, the present invention is not limited to hybrid vehicles, and is also applicable to electrically powered vehicles in general.

Referring to FIG. 1, vehicle 5 includes a battery 10, system main relays 22 and 24, a power controls unit (PCU) 30, motor generators 41 and 42, an engine 50, a power split device 60, a driving shaft 70, and a wheel 80.

Battery 10 is a battery pack having a plurality of rechargeable lithium ion battery cells connected in series. Battery 10 may be configured to be electrically chargeable by a power supply external to vehicle 5. Note that the present invention is not limited to the rechargeable lithium ion battery, but is also applicable to rechargeable batteries in general for which grasping whether they have a degraded state is required.

Engine 50 outputs kinetic energy through energy generated by combusting fuel. Power split device 60 is coupled with the output shafts of motor generators 41 and 42 and engine 50 to use the output(s) of motor generator 42 and/or engine 50 to drive driving shaft 70, which in turn rotates wheel 80. Vehicle 5 thus travels on the output(s) of engine 50 and/or motor generator 42.

While motor generators 41 and 42 may function as an electric power generator as well as an electric motor, motor generator 41 operates mainly as an electric power generator and motor generator 42 operates mainly as an electric motor.

More specifically, motor generator 41 is employed as a starter to start engine 50 for acceleration or similarly when starting the engine is requested. At the time, motor generator 41 receives electric power from battery 10 via PCU 30 to be driven as an electric motor to crank and thus start the engine. Furthermore, after engine 50 is started, motor generator 41 can be rotated by an output of the engine transmitted via power split device 60 to generate electric power.

Motor generator 42 is driven by at least one of the electric power stored in battery 10 and the electric power generated by motor generator 41. Motor generator 42 provides driving force which is in turn transmitted to driving shaft 70. Motor generator 42 thus assists engine 50 to cause vehicle 5 to travel, or provides driving force to alone cause vehicle 5 to travel.

Furthermore, when vehicle 5 is regeneratively braked, motor generator 42 is driven by the wheel's torque to operate as an electric power generator. At the time, motor generator 42 regenerates electric power which is in turn charged via PCU 30 to battery 10.

PCU 30 performs bidirectional electric power conversion between battery 10 and motor generators 41 and 42, and also controls the electric power conversion so that motor generators 41 and 42 operate in accordance with operation command values (representatively, torque command values), respectively. For example, PCU 30 includes an inverter or the like to receive direct current electric power from battery 10, convert it into alternating current electric power, and apply it to motor generators 41 and 42. This inverter can also convert the electric power that is regenerated by motor generators 41 and 42 into direct current electric power to charge battery 10 therewith.

System main relays 22 and 24 are provided between PCU 30 and battery 10. System main relays 22 and 24 are turned on/off in response to a relay control signal SE. When system main relays 22 and 24 are turned off (or opened), a path to electrically charge/discharge battery 10 is mechanically interrupted.

Vehicle 5 is further equipped with a monitoring unit 20 for monitoring battery 10, a control circuit 100, and a display device 200. As will be described later, monitoring unit 20 has an overvoltage detection mechanism incorporated therein, and the overvoltage detection mechanism's output is also input to control circuit 100.

Monitoring unit 20 outputs to control circuit 100 a state of battery 10 based on the outputs of a temperature sensor 12, a voltage sensor 14 and a current sensor 16 provided for battery 10.

Note that, in FIG. 1, temperature sensor 12 and voltage sensor 14 are each shown collectively. That is, in reality, a plurality of temperature sensors 12 and a plurality of voltage sensors 14 are provided. Furthermore, a plurality of current sensors 16 may be provided.

Control circuit 100 is configured of an electronic control unit (ECU) having a central processing unit (CPU) and a memory (not shown) incorporated therein, and performs a predetermined operation process based on information stored in that memory. The memory includes electrically erasable programmable read only memory (EEPROM) allowing its contents to be electrically rewritten.

Control circuit 100 operates in response to an amount by which the user operates the accelerator, the vehicle's speed and the like to set a value of torque requested for motor generators 41 and 42. Control circuit 100 controls PCU 30 to provide electric power conversion so that motor generators 41 and 42 operate in accordance with this requested torque value. In doing so, control circuit 100 controls PCU 30 so that battery 10 is neither charged with electric power exceeding an upper limit value Win of charging electric power nor discharges electric power exceeding an upper limit value Wout of discharging electric power.

Note that engine 50 is controlled by another ECU which is not shown. Furthermore, while FIG. 1 shows control circuit 100 as a single unit, is may be divided into two or more distinctive units.

Display device 200 displays various messages for the user in accordance with a control signal received from control circuit 100. Display device 200 displays messages including a message to request the user to subject battery 10 to a diagnosis done by a diagnostic device 300 to see whether the battery has a degraded state (hereinafter also referred to as a "battery diagnosis") (hereinafter also referred to as a "diagnosis request message"), as will be described later, a message to inform the user that battery 10 cannot be used (hereinafter also referred to as a "message indicating that the battery is unusable"), and the like Furthermore, vehicle 5 is configured to be connectable to diagnostic device 300. Hereinafter, diagnostic device 300 will be described as being installed in a repair shop provided for a dealer or the like. Note that diagnostic device 300 may not be provided external to vehicle 5, and diagnostic device 300 may be provided internal to vehicle 5. If diagnostic device 300 is provided internal to vehicle 5, then, for example, diagnostic device 300 is operated to conduct a battery diagnosis in accordance with the user's instructions with the vehicle stopped.

Once diagnostic device 300 has been connected to vehicle 5, a state is established to allow diagnostic device 300 and control circuit 100 to communicate with each other.

Diagnostic device 300 is operated by a serviceman or the like who works in the repair shop. Diagnostic device 300 communicates with control circuit 100 to conduct a battery diagnosis. In the battery diagnosis, an amount of lithium deposited in battery 10 is measured from a decrease in voltage caused when battery 10 is electrically discharged. Then, from the amount of lithium deposited as measured, diagnostic device 300 diagnoses whether battery 10 can continue to be used, no longer continue to be used, or is regarded as a new article (i.e., has been replaced with or is as good as a new article).

Diagnostic device 300 transmits to control circuit 100 a signal R1 for a diagnosis result indicating that the battery can continue to be used, a signal R2 for a diagnosis result indicating that the battery can no longer continue to be used, and a signal R3 for a diagnosis result indicating that the battery is regarded as a new article.

Figure 2:
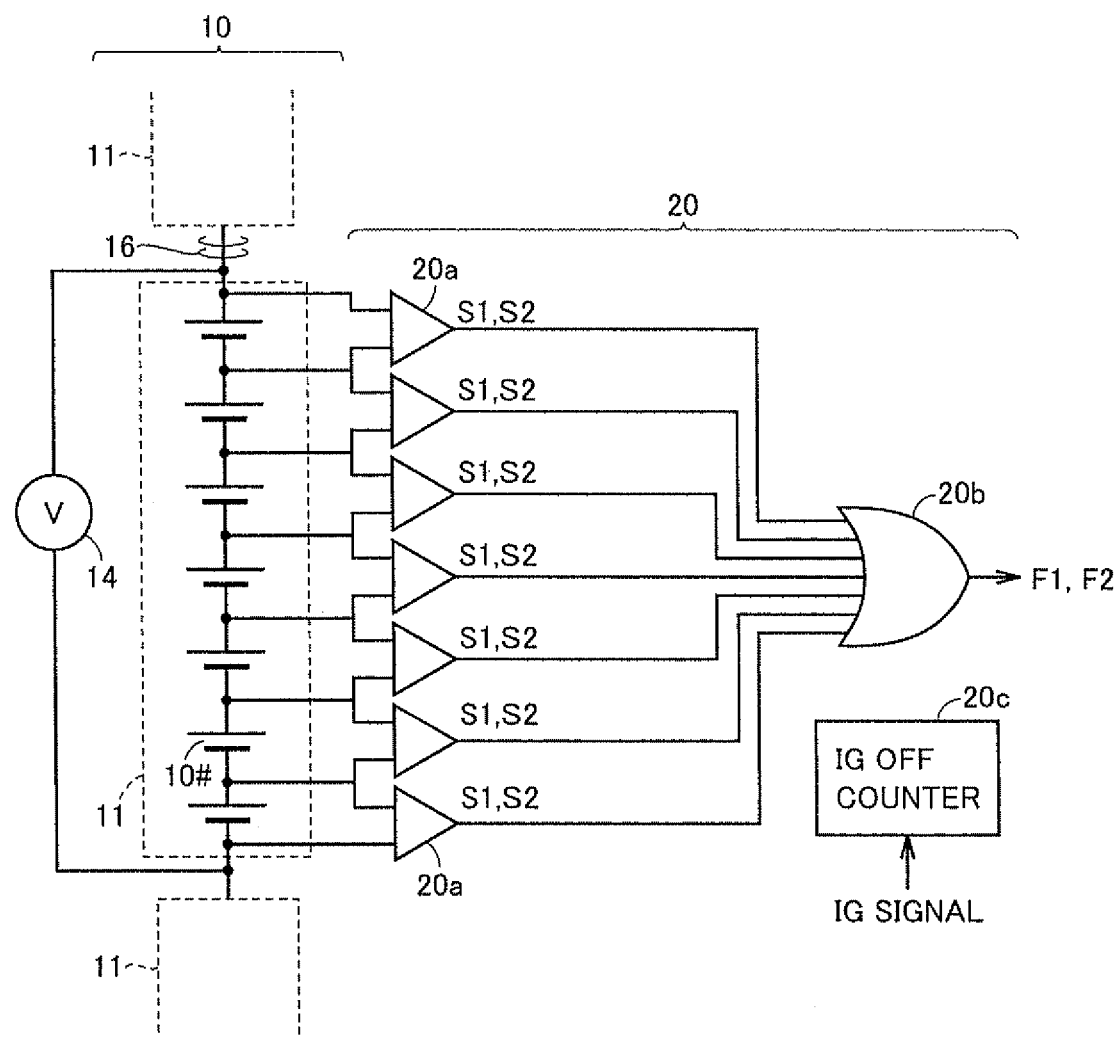
FIG. 2 shows a battery and a monitoring unit in configuration.

FIG. 2 shows battery 10 and monitoring unit 20 in configuration.

Battery 10 is configured of a plurality of battery blocks 11. Each battery block 11 is configured of N battery cells 10# connected in series, wherein N is an integer equal to or greater than 2. Note that FIG. 2 illustrates a configuration for N=7.

Voltage sensor 14 is provided for each battery block 11 and senses voltage output from each battery block 11.

Monitoring unit 20 has a plurality of voltage comparator circuits 20a associated with battery cells 10#, respectively, in battery block 11, an overvoltage detection circuit 20b connected to each voltage comparator circuit 20a, and an IG off counter 20c. Voltage comparator circuit 20a and overvoltage detection circuit 20b shown in FIG. 2 are provided for each battery block 11. Note that overvoltage detection circuit 20b may be provided internal to control circuit 100.

Each voltage comparator circuit 20a compares a voltage across battery cell 10# associated therewith (or a cell voltage) with a determination voltage V1 (of 4.05 V for example) for determining overvoltage, and if the cell voltage exceeds determination voltage V1, voltage comparator circuit 20a outputs a signal S1 to overvoltage detection circuit 20b. Similarly, each voltage comparator circuit 20a compares a cell voltage associated therewith with a determination voltage V2 (of 4.25 V for example), and if the cell voltage exceeds determination voltage V2, voltage comparator circuit 20a outputs a signal S2 to overvoltage detection circuit 20b.

When overvoltage detection circuit 20b receives signal S1 from at least one of voltage comparator circuits 20a, overvoltage detection circuit 20b outputs an overvoltage detection signal F1 to control circuit 100. Similarly, when overvoltage detection circuit 20b receives signal 82 from at least one of voltage comparator circuits 20a, overvoltage detection circuit 20b outputs an overvoltage detection signal F2 to control circuit 100.

IG off counter 20c counts and stores a period of time elapsing since a switch operated to indicate an instruction to start/stop a system to drive vehicle 5 (hereinafter referred to as an "IG switch") is turned off (hereinafter referred to as "IG off time Tigoff"). Note that IG off counter 20c counts three types of IG off times Tigoffs with their respective least significant bits (LSB) corresponding to 1 minute, 1 hour, and 1 day, respectively. When the IG switch is turned on, IG off counter 20c outputs IG off time Tigoff stored therein to control circuit 100 and also initializes (or zeros) IG off time Tigoff stored therein.

When battery 10 or a similar rechargeable lithium ion battery is used for a long period of time, there is a possibility that it may have metallic lithium deposited therein and fail.

Figure 3:
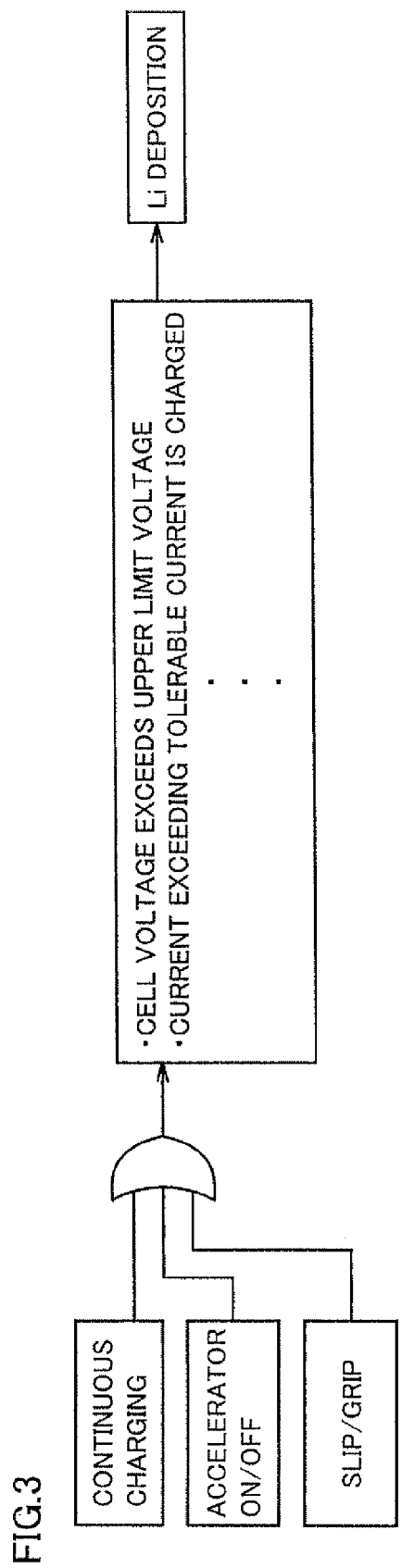
FIG. 3 shows a logic of metallic lithium deposition in a battery.

FIG. 3 shows a logic of metallic lithium deposition in battery 10. As shown in FIG. 3, when battery 10 is electrically charged continuously, the accelerator is turned on/off, wheel 80 slips/grips, and/or the like, battery 10 has each cell with a voltage exceeding the determination voltage, a current exceeding a tolerance value is charged to battery 10, and/or the like. Such a condition serves as a factor to deposit metallic lithium in battery 10.

Figure 4:
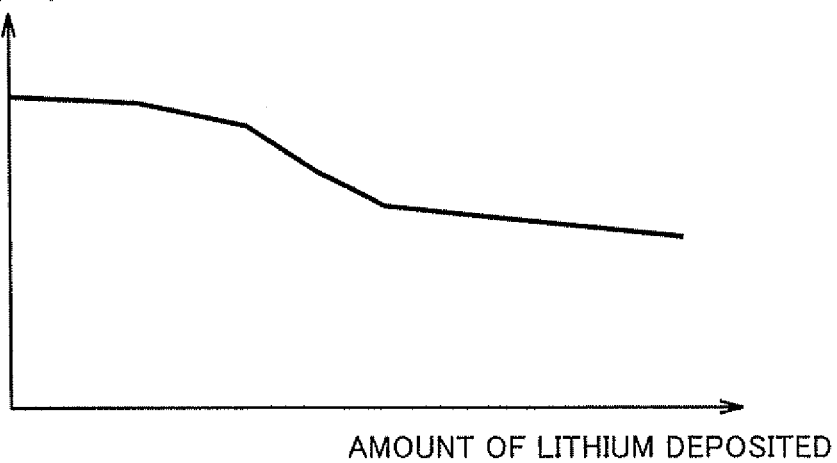
FIG. 4 shows a relationship between an amount of lithium deposited and a temperature at which a battery starts failing.

FIG. 4 shows a relationship between an amount of lithium deposited and a temperature at which battery 10 starts failing. As shown in FIG. 4, larger amounts of lithium deposited decrease more the temperature at which battery 10 starts failing. That is, lithium deposited in larger amounts provides a larger possibility that battery 10 may fail. Once battery 10 has failed, it can no longer supply motor generators 41 and 42 with electric power, and the vehicle can substantially no longer travel.

In order to avoid such a situation, it is desirable to periodically undergo a battery diagnosis done by diagnostic device 300, as described above, to accurately grasp deposition of lithium, and replace battery 10 with a new article, if necessary.

Accordingly, control circuit 100 according to the present embodiment estimates an amount of lithium deposited from a history of how battery 10 has been used, and when the amount of lithium deposited, as estimated, reaches an amount of an upper limit, control circuit 100 warns the user that it is necessary to conduct a battery diagnosis, and urges the user to conduct the battery diagnosis. Thereafter a predetermined period of time elapses, and if then the battery diagnosis is still not conducted, then, control circuit 100 restricts (or limits or prohibits) using battery 10.

Figure 5:
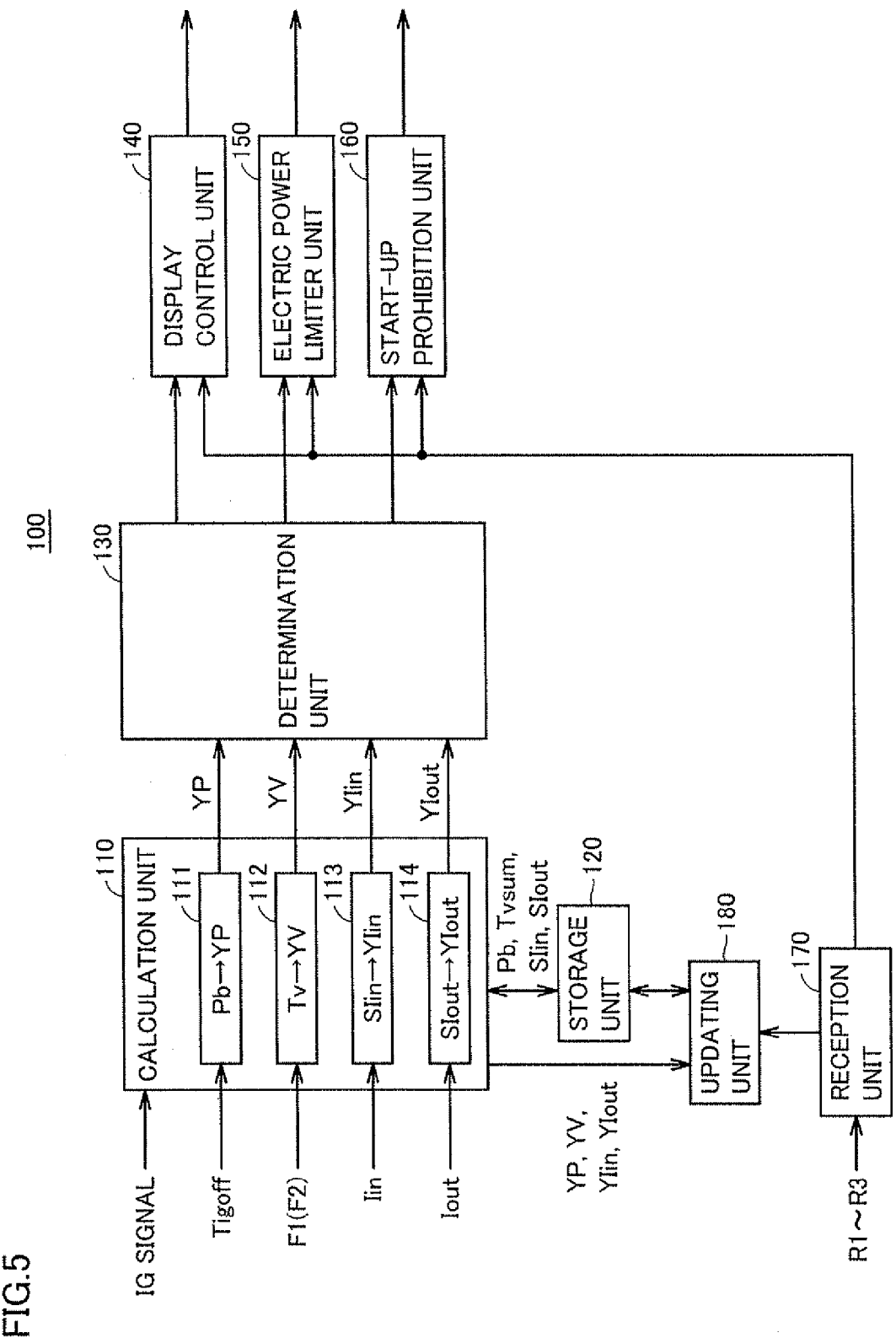
FIG. 5 is a functional block diagram of a control circuit.

FIG. 5 is a functional block diagram of a portion of control circuit 100 that is involved in the battery diagnosis. Note that each functional block shown in FIG. 5 may be implemented by hardware (electronic circuitry or the like) or software processing (e.g., executing a program).

Control circuit 100 includes a calculation unit 110, a storage unit 120, a determination unit 130, a display control unit 140, an electric power limiter unit 150, and a start-up prohibition unit 160. Furthermore, control circuit 100 includes a reception unit 170 and an updating unit 180.

Calculation unit 110 calculates a "battery age Y" based on a history of how battery 10 has been used. Battery age Y corresponds to an extent to which battery 10 has degraded, i.e., a value indicating an amount of lithium deposited, as estimated, and battery age Y is used to determine whether it is necessary to conduct a battery diagnosis.

Calculation unit 110 calculates 4 types of battery ages Ys for different factors of deposition of lithium. The 4 types of battery ages Ys are calculated by a first calculation unit 111, a second calculation unit 112, a third calculation unit 113, and a fourth calculation unit 114, respectively.

Initially, first calculation unit 111 will be described. First calculation unit 111 uses the above described IG off time Tigoff and a period of time having elapsed since the IG switch was turned on (hereinafter referred to as "IG on time Tigon") to calculate a period for which battery 10 has been used (hereinafter a "battery use period Pb"), and first calculation unit 111 stores the calculated battery use period Pb to storage unit 120, and also converts the calculated battery use period Pb into battery age Y. Hereinafter, battery use period Pb as converted to battery age Y will be referred to as a "battery age YP".

When the IG switch is turned on, first calculation unit 111 reads battery use period Pb from storage unit 120, and adds thereto IG off time Tigoff received from monitoring unit 20 (see the following expression (1)):

$$Pb=Pb+Tigoff \qquad (1)$$

Once the IG switch has been turned on, first calculation unit 111 counts IG on time Tigon, periodically reads battery use period Pb from storage unit 120, and adds IG on time Tigon to battery use period Pb as read (see the following expression (2)):

$$Pb=Pb+Tigon \qquad (2)$$

Whenever first calculation unit 111 calculates battery use period Pb, first calculation unit 111 updates battery use period Pb that is stored in storage unit 120 to the latest value.

Figure 6:
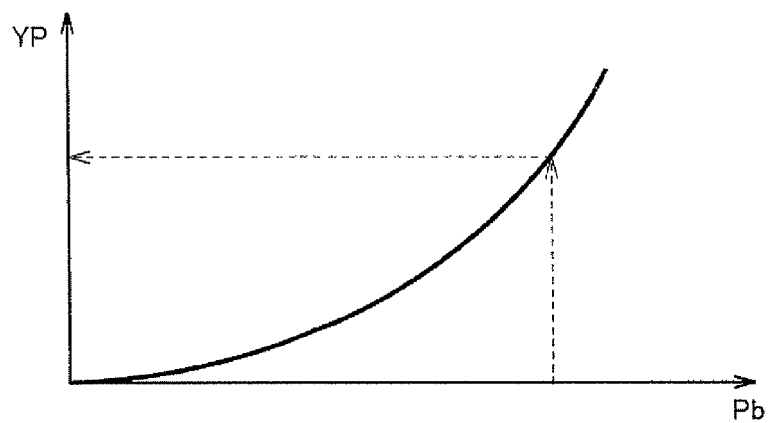
FIG. 6 is a map representing a relationship between a battery use period Pb and a battery age YP.

FIG. 6 is a map representing a relationship between battery use period Pb and battery age YP. First calculation unit 111 uses the FIG. 6 map to convert battery use period Pb into battery age YP. Then, first calculation unit 111 outputs battery age YP to determination unit 130.

Then, returning to FIG. 5, second calculation unit 112 will be described. Second calculation unit 112 accumulates periods of time for which overvoltage detection signal F1 continues to be received from monitoring unit 20 beyond a predetermined period of time, to calculate the value of the accumulated periods of time (hereinafter referred to as "cell overvoltage time Tv"), and second calculation unit 112 stores the calculated cell overvoltage time Tv to storage unit 120, and also converts the calculated cell overvoltage time Tv into battery age Y. Hereinafter, cell overvoltage time Tv as converted into battery age Y will be referred to as a "battery age YV."

Figure 7:
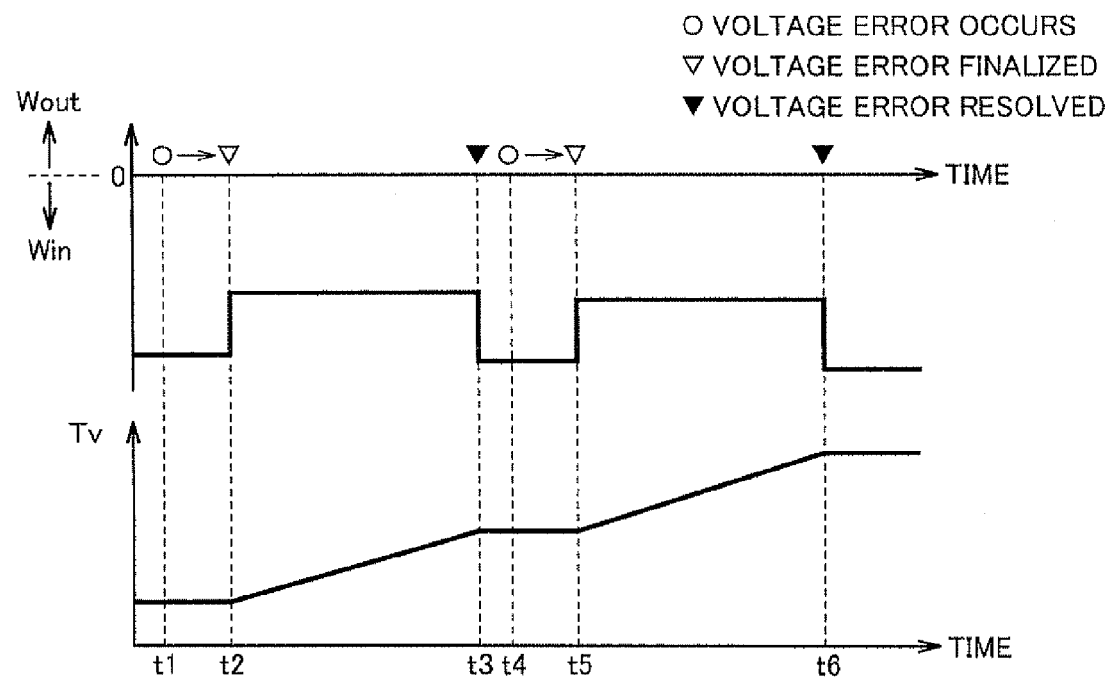
FIG. 7 shows a technique used to calculate a cell overvoltage time Tv.

FIG. 7 shows a technique used to calculate cell overvoltage time Tv. At time t1, a voltage error occurs (i.e., overvoltage detection signal F1 is received). Thereafter, a predetermined period of time elapses, or time t2 is reached, and if the voltage error still continues, then, second calculation unit 112 finalizes the voltage error and reads cell overvoltage time Tv from storage unit 120, and sets the read cell overvoltage time Tv as an initial value to start counting cell overvoltage time Tv. Thereafter at time t3 the voltage error is resolved (or overvoltage detection signal F1 is no longer received), and accordingly, second calculation unit 112 stops counting cell overvoltage time Tv, and stores cell overvoltage time Tv to storage unit 120. Thereafter at time t4 a voltage error occurs again and at time t5 the voltage error is finalized, and accordingly, second calculation unit 112 reads cell overvoltage time Tv from storage unit 120, and sets the value as an initial value to start counting cell overvoltage time Tv. Thereafter at time t6 the voltage error is resolved and accordingly second calculation unit 112 stops counting cell overvoltage time Tv and stores cell overvoltage time Tv to storage unit 120. Note that in the FIG. 7 example, while a voltage error is finalized, i.e., for the period of t2-t3 and that of t5-t6, upper limit value Win of charging electric power is limited (or approximated to 0) to suppress overcharging.

Figure 8:
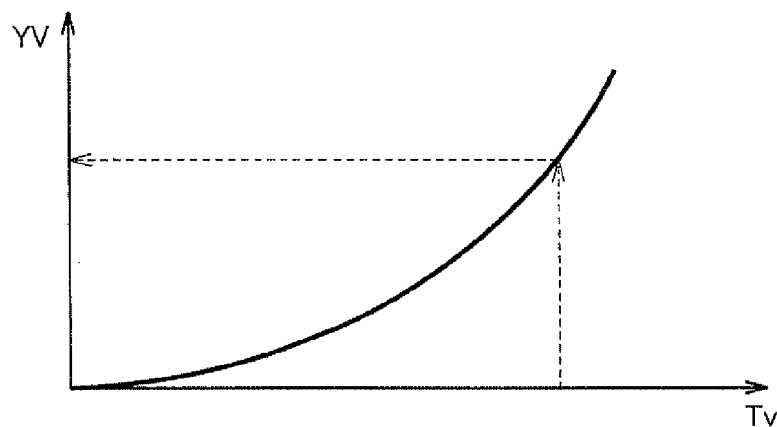
FIG. 8 is a map representing a relationship between cell overvoltage time Tv and a battery age YV.

FIG. 8 is a map representing a relationship between cell overvoltage time Tv and battery age YV. Second calculation unit 112 uses the FIG. 8 map to convert cell overvoltage time Tv into battery age YV. Then, second calculation unit 112 outputs battery age YV to determination unit 130. Note that overvoltage detection signal F2 may also be processed similarly as overvoltage detection signal F1 is.

Returning to FIG. 5, third calculation unit 113 will be described. Third calculation unit 113 calculates an integrated value of a current charged to battery 10 beyond an input limit value Ilim set for suppressing deposition of lithium (hereinafter referred to as "integrated value SIin of overcurrent"), and stores the calculated integrated value Kin of overcurrent to storage unit 120, and also converts the calculated integrated value Shin of overcurrent into battery age Y. Hereinafter, integrated value SIin of overcurrent as converted to battery age Y will be referred to as a "battery age YIin".

Figure 9:
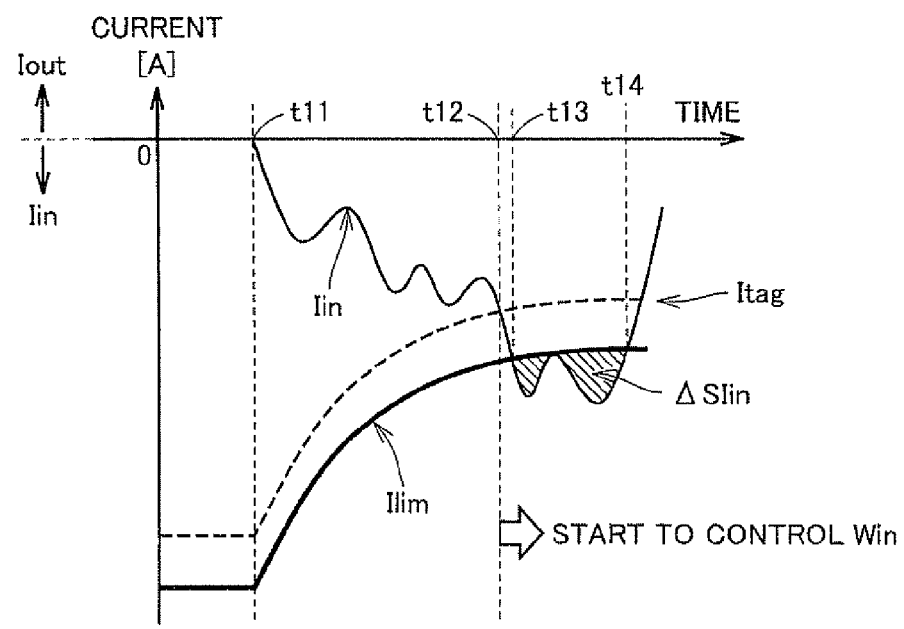
FIG. 9 shows a technique used to calculate an integrated value Sun of overcurrent.

FIG. 9 shows a technique used to calculate integrated value Shin of overcurrent. For time t13 to time t14, a battery charging current Iin is beyond input limit value Ilim, and third calculation unit 113 accumulates a value of a current charged to battery 10 for time t13 to time t14 beyond input limit value Ilim, which is indicated by Ilin minus Tin, to provide an integrated value ΔSIin, which corresponds to a hatched area shown in FIG. 8. Then, third calculation unit 113 reads integrated value Shin of overcurrent stored in storage unit 120 and adds the calculated integrated value ΔSIin to the read integrated value Kin of overcurrent to provide a new integrated value Kin of overcurrent (see the following expression (3)):

$$SIin = SIin + \Delta SIin \quad (3)$$

Whenever third calculation unit 113 calculates integrated value SIin of overcurrent, third calculation unit 113 updates integrated value Sun of overcurrent that is stored in storage unit 120 to the latest value. Note that in the FIG. 9 example, at time t12, i.e., once battery charging current Iin has exceeded a target input value Itag, limiting upper limit value Win of charging electric power is started to suppress overcharging.

Figure 10:
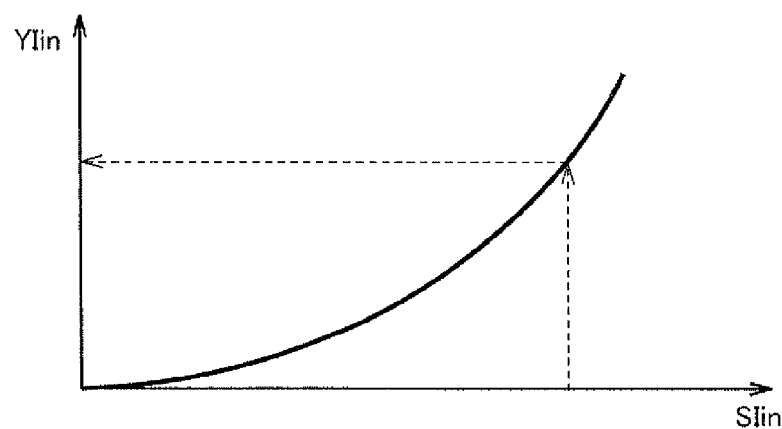
FIG. 10 is a map representing a relationship between integrated value Sun of overcurrent and a battery age YIin.

FIG. 10 is a map representing a relationship between integrated value Sun of overcurrent and battery age YIin. Third calculation unit 113 uses the FIG. 10 map to convert integrated value SIin of overcurrent into battery age YIin.

Returning to FIG. 5, fourth calculation unit 114 will be described. Fourth calculation unit 114 calculates an integrated value of a current Tout discharged from battery 10 (hereinafter referred to as "integrated value SIout of discharging current"), and stores the calculated integrated value SIout of discharging current to storage unit 120, and also converts the calculated integrated value SIout of discharging current into battery age Y. Hereinafter, integrated value SIout of discharging current as converted to battery age Y will be referred to as a "battery age YIout".

Figure 11:
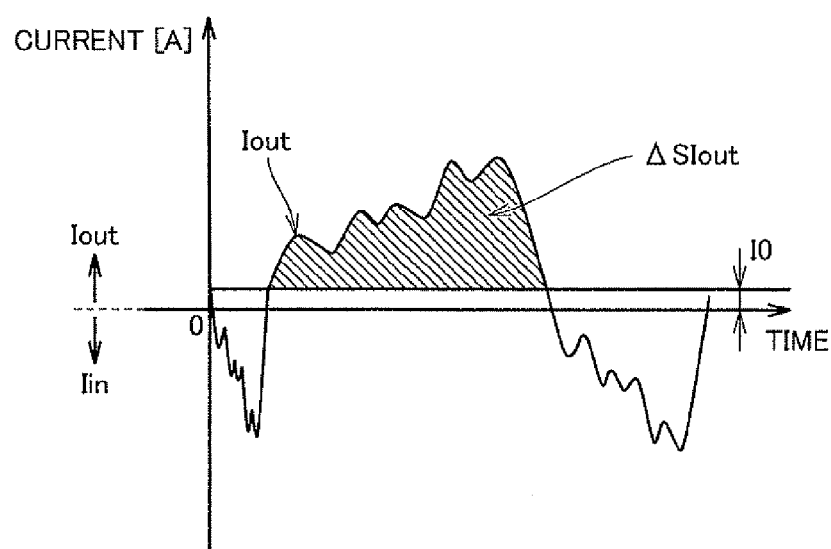
FIG. 11 shows a technique used to calculate an integrated value SIout of discharging current.

FIG. 11 shows a technique used to calculate integrated value SIout of discharging current. As shown in FIG. 11, when discharging current Iout is beyond an offset error I0, a current discharged from battery 10 beyond offset error I0, which is represented as Iout minus I0, is numerically accumulated to provide an integrated value ΔSIout, which corresponds to a hatched area shown in FIG. 11. Then, fourth calculation unit 114 reads integrated value SIout of discharging current stored in storage unit 120 and adds the calculated integrated value ΔSIout to the read integrated value SIout of discharging current to provide a new integrated value SIout of discharging current (see the following expression (4)):

$$SIout = SIout + \Delta SIout \quad (4)$$

Whenever fourth calculation unit 114 calculates integrated value SIout of discharging current, fourth calculation unit 114 updates integrated value SIout of discharging current that is stored in storage unit 120 to the latest value.

Figure 12:
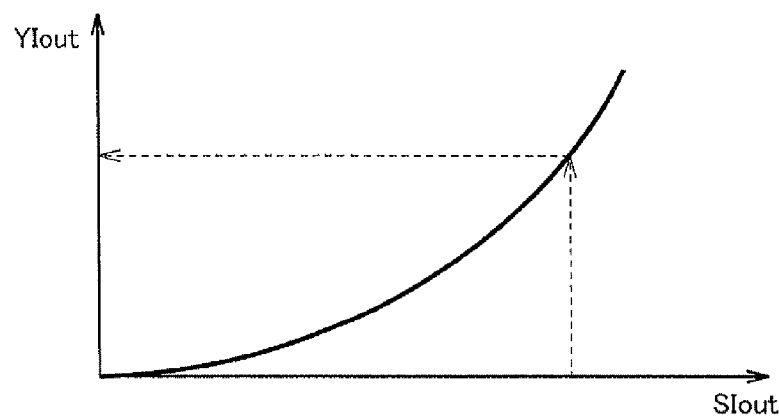
FIG. 12 is a map representing a relationship between integrated value SIout of discharging current and a battery age YIout.

FIG. 12 is a map representing a relationship between integrated value SIout of discharging current and battery age YIout. Fourth calculation unit 114 uses the FIG. 12 map to convert integrated value SIout of discharging current into battery age YIout.

Note that battery ages YP, YT, YIin, and YIout are also output to updating unit 180 described hereinafter.

Thus, calculation unit 110 calculates battery use period Pb, cell overvoltage time Tv, integrated value Sun of overcurrent, and integrated value SIout of discharging current as parameters, and converts the parameters into battery ages YP, YT, YIin, and YIout, respectively.

Note that calculation unit 110 may calculate types of parameters other than Pb, Tv, SIin, and SIout. Furthermore, calculation unit 110 may calculate any number of parameters other than the four parameters of Pb, Tv, SIin, SIout. For example, for alleviated processing load, only one parameter of battery use period Pb may be used. For increased precision in determining whether it is necessary to conduct a battery diagnosis, however, it is desirable to use a plurality of parameters including at least two of Pb, Tv, SIin, and SIout.

Returning to FIG. 5, as described above, storage unit 120 receives and stores therein battery use period Pb, cell overvoltage time Tv, integrated value Min of overcurrent, and integrated value SIout of discharging current as parameters that have been updated to the latest values.

Note that when control circuit 100 is replaced with a new article, each parameter's information will be lost. Accordingly, it is desirable that each parameter should also be stored to a memory of a controller that is different from control circuit 100 (e.g., an ECU which controls engine 50) and simultaneously replacing the two ECUs should be avoided.

Determination unit 130 determines for each battery age YP, YT, YIin and YIout individually whether battery age Y has reached a predetermined upper limit age, and determination unit 130 determines therefrom whether it is necessary to conduct a battery diagnosis. The upper limit age is set at a value smaller by several years than an age limit obtained through a test or the like with an error considered. Note that hereinafter the upper limit age is set as 20 years for the sake of illustration.

If at least one of battery ages YP, YT, YIin, and YIout has reached 20 years, determination unit 130 determines that it is necessary to conduct a battery diagnosis, otherwise, determination unit 130 determines that it is unnecessary to conduct the battery diagnosis.

Figure 13:
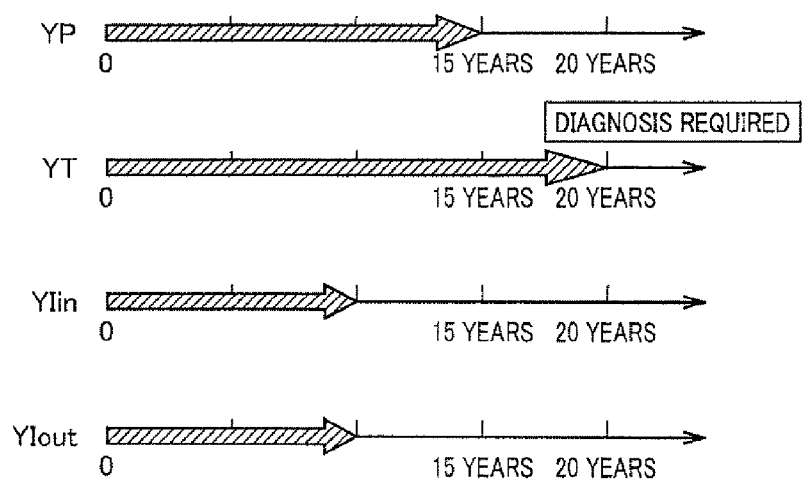
FIG. 13 shows a technique used to determine whether it is necessary to conduct a battery diagnosis.

FIG. 13 shows a technique used to determine whether it is necessary to conduct a battery diagnosis. As shown in FIG. 13, if at least one of battery ages YP, YT, YIin, and YIout has reached 20 years, determination unit 130 determines that it is necessary to conduct the battery diagnosis when battery age YT reaches 20 years.

Returning to FIG. 5, determination unit 130 outputs the resultant determination to display control unit 140, electric power limiter unit 150, and start-up prohibition unit 160.

Once it has been determined that it is necessary to conduct the battery diagnosis, display control unit 140 causes display device 200 to display the above described diagnosis request message. The user can thus be informed that it is time to conduct a battery diagnosis.

Display device 200 starts displaying the diagnosis request message (or it is determined that it is necessary to conduct a battery diagnosis), and thereafter a first period of time elapses, and if then there still is no diagnosis result received from reception unit 170 describes later, then, electric power limiter unit 150 limits upper limit value Win of charging electric power and upper limit value Wout of discharging electric power (this limitation is hereinafter referred to as "Win/Wout limitation"). This allows battery 10 to be charged with/discharge limited electric power and thus degrade more slowly. As time elapses, electric power limiter unit 150 applies the Win/Wout limitation in a gradually increasing amount. Note that hereinafter the first period of time is set as one month for the sake of illustration.

Display device 200 starts displaying the diagnosis request message, and thereafter a second period of time longer than one month (or the first period of time) elapses, and if then there still is no diagnosis result received from reception unit 170, then, start-up prohibition unit 160 prohibits starting the system driving vehicle 5. Thus vehicle 5 can no longer travel and using battery 10 is substantially prohibited. Note that hereinafter the second period of time is set as two months for the sake of illustration.

When a user brings vehicle 5 to a repair shop to have the vehicle subjected to a battery diagnosis, reception unit 170 receives a diagnosis result (or any of signals R1-R3) from diagnostic device 300. Reception unit 170 outputs the received diagnosis result to updating unit 180, display control unit 140, electric power limiter unit 150, and start-up prohibition unit 160.

Updating unit 180 follows a result of the battery diagnosis received via reception unit 170 to update parameters (battery use period Pb, cell overvoltage time Tv, integrated value SIin of overcurrent, and integrated value SIout of discharging current) described in storage unit 120.

Initially will be described an updating technique used when a diagnosis result indicates that the battery can continue to be used. If any of the four battery ages Ys calculated by calculation unit 110 has reached the upper limit age of 20 years (or it is after a diagnosis request message is displayed), updating unit 180 returns that battery age Y to a predetermined age smaller than 20 years and also sets the battery ages Ys that have not reached 20 years to the predetermined age. Note that hereinafter the predetermined age is set as 15 years for the sake of illustration.

Figure 14:
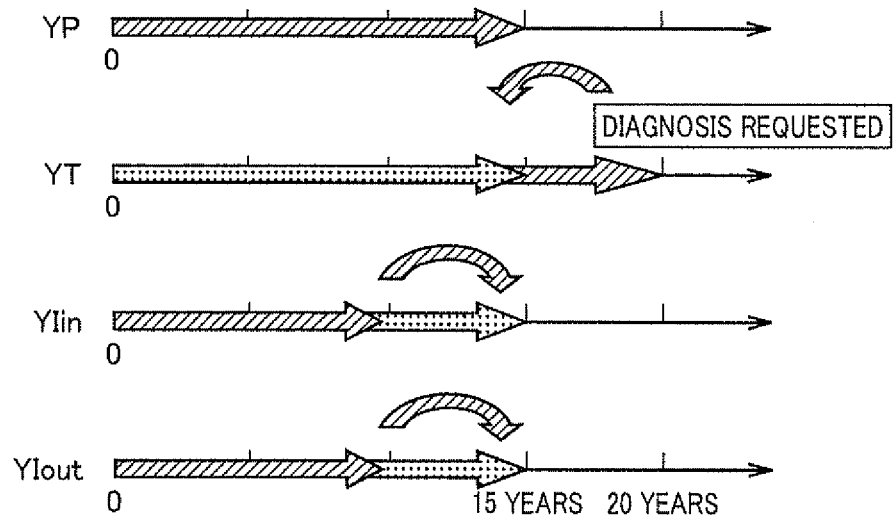
FIG. 14 is a first diagram to show a technique used to update a battery age Y.

FIG. 14 shows a technique used to update battery age Y when the diagnosis request message is displayed and thereafter a battery diagnosis is done and a diagnosis result indicating that the battery can continue to be used is provided. In the FIG. 14 example, updating unit 180 rewinds battery age YT that has reached 20 years by five years to 15 years, and also updates the other battery ages that have not reached 20 years, i.e., YP, YIin and YIout, to 15 years. That is, updating unit 180 uses the maps of FIGS. 6, 8, 10 and 12 to calculate the value of each parameter that corresponds to 15 years when it is converted into each battery age Y, and updating unit 180 uses each calculated value to update each parameter stored in storage unit 120. Such updating done after diagnosis will set each battery age Y to have an initial value of 15 years. That is, the initial diagnosis request message is displayed once a period of 20 years has elapsed, and thereafter if battery 10 continues to be used, then, whenever a period of five years elapses a subsequent diagnosis request message is displayed to urge the user to conduct a diagnosis early.

If there is no battery age Y having reached 20 years (or it is before a diagnosis request message is displayed), and there also is any battery age Y that almost reaches 20 years (or it is immediately before a diagnosis request message is displayed), then, updating unit 180 returns each battery age Y to 15 years, otherwise updating unit 180 does not update each battery age Y and instead holds it as it is. Note that, hereinafter, battery age Y almost reaching 20 years is described as 15 years or larger and less than 20 years.

Figure 15:
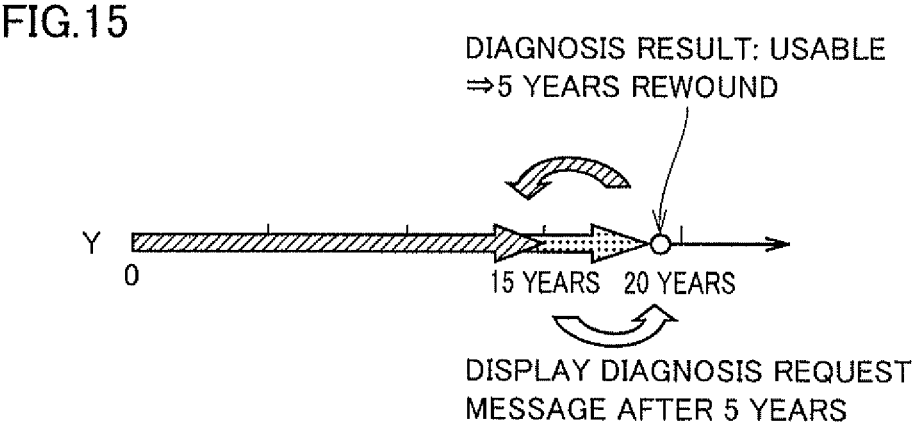
FIG. 15 is a second diagram to show a technique used to update battery age Y.
Figure 16:
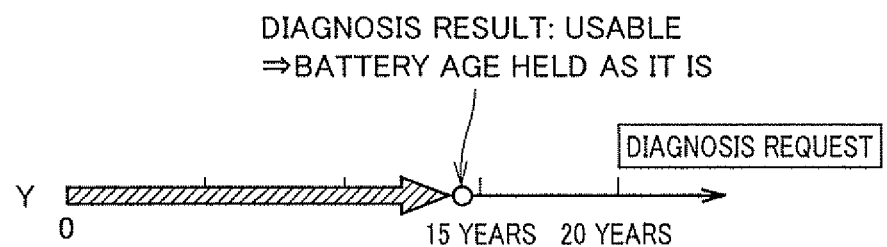
FIG. 16 is a third diagram to show a technique used to update battery age Y.

FIGS. 15 and 16 show a technique used to update battery age Y in a case where before a diagnosis request message is displayed a battery diagnosis is conducted and a diagnosis result indicating that the battery can continue to be used is provided. In that case, updating unit 180 initially determines whether there is any battery age Y of 15 years or larger and less than 20 years.

If so, then, as shown in FIG. 15, updating unit 180 returns battery age Y of 15 years or larger and less than 20 years to 15 years and also updates other battery ages Ys to 15 years. Accordingly, the next diagnosis request message will be displayed after the diagnosis when a period of five years elapses. It is thus avoidable that a diagnosis request message is displayed immediately after the diagnosis.

In contrast, if battery ages Ys are all less than 15 years, updating unit 180 does not update battery ages Ys and instead holds them as they are, as shown in FIG. 16. It is thus avoidable that a diagnosis request message is displayed before battery 10 is used for a period of 20 years.

Then will be described an updating technique used when a diagnosis result indicates that the battery can no longer continue to be used. In that case, updating unit 180 updates all battery ages Ys to the upper limit age of 20 years. That is, updating unit 180 uses the maps of FIGS. 6, 8, 10, and 12 to calculate the value of each parameter that corresponds to 20 years when it is converted into each battery age Y, and updating unit 180 uses each calculated value to update each parameter stored in storage unit 120. Such updating done after a diagnosis result is provided indicating that the battery can no longer continue to be used will set each battery age Y at the upper limit age of 20 years. Then, a message indicating that the battery is unusable will be displayed, as will be described hereinafter.

Then will be described an updating technique used when a diagnosis result indicates that the battery is regarded as a new article. In that case, updating unit 180 initializes all battery ages Ys to 0 year. That is, updating unit 180 initializes to 0 each parameter stored in storage unit 120.

Thus, updating unit 180 follows a result of a battery diagnosis to update each parameter described in storage unit 120.

Returning to FIG. 5, if a diagnosis result indicates that the battery can no longer continue to be used, and a diagnosis request message is also currently displayed, then, display control unit 140 ceases displaying the diagnosis request message and instead causes display device 200 to display a message indicating that the battery is unusable. In contrast, if the diagnosis result indicates that the battery can continue to be used or that the battery is regarded as a new article, and a diagnosis request message or a message indicating that the battery is unusable is also currently displayed, then, display control unit 140 ceases displaying the message.

If the diagnosis result indicates that the battery can continue to be used or that the battery is regarded as a new article, and the Win/Wout limitation is also currently applied, then, electric power limiter unit 150 resolves the Win/Wout limitation.

If the diagnosis result indicates that the battery can no longer continue to be used, start-up prohibition unit 160 prohibits starting the system driving vehicle 5. In contrast, if the diagnosis result indicates that the battery can continue to be used or that the battery is regarded as a new article, and starting the driving system is also currently prohibited, then, display control unit 140 resolves the prohibition of starting the driving system.

Figure 17:
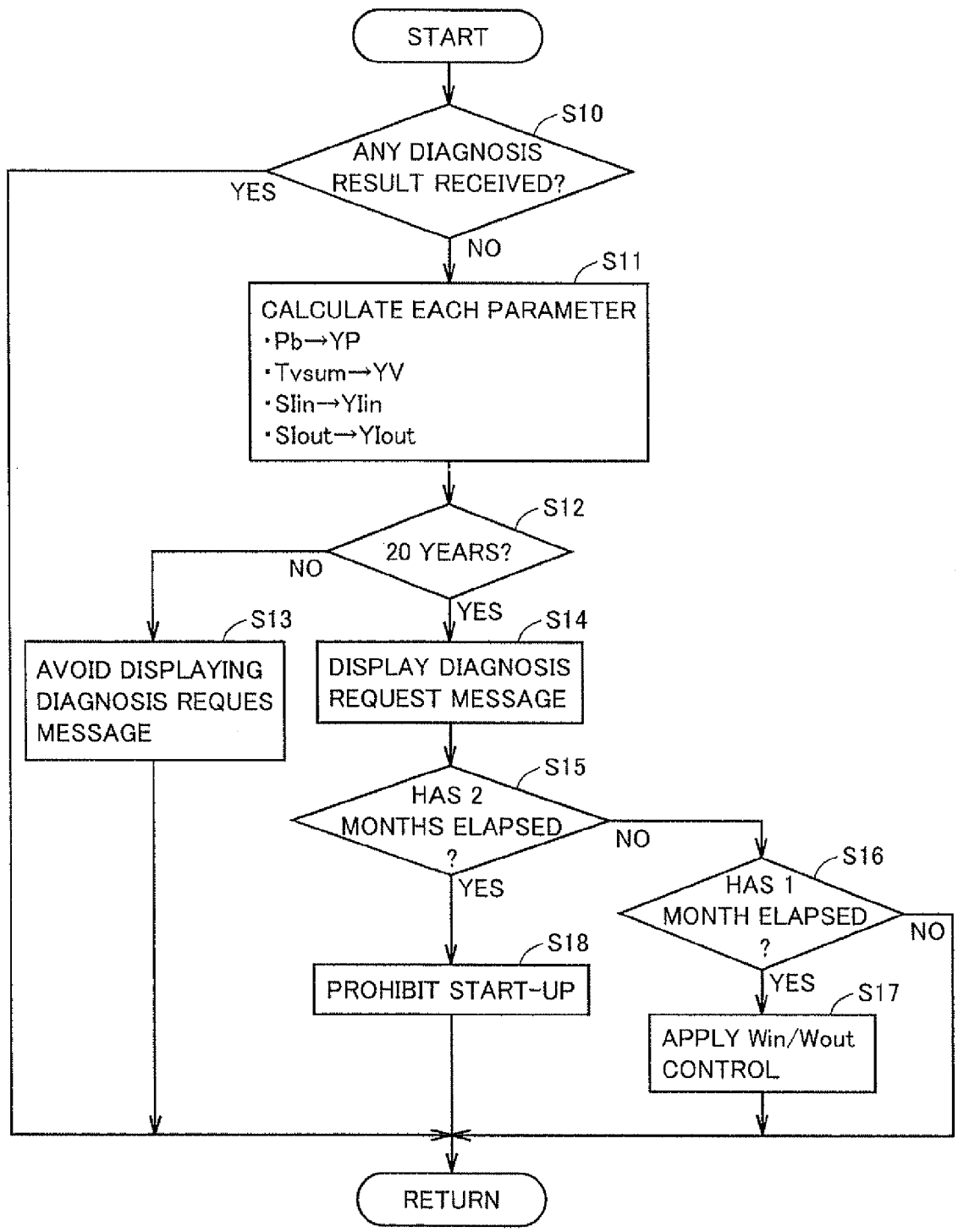
FIG. 17 is a first flowchart to represent a procedure of a process done by the control circuit.

FIG. 17 is a flowchart of a procedure of a process for mainly implementing a function of control circuit 100 involved in a process performed before the battery diagnosis. Note that while each step (hereinafter abbreviated as "S") of the flowchart indicated hereinafter is basically implemented by a software processing performed by control circuit 100, the steps may be implemented by a hardware processing performed by electronic circuitry or the like provided in control circuit 100.

In S10, control circuit 100 determines whether any battery diagnosis result (any of signals R1-R3) has been received from diagnostic device 300. If not (NO at S10), the control proceeds to S11. If any battery diagnosis result is received (YES at S10), the process ends.

In S11, as has been described above, control circuit 100 calculates battery use period Pb, cell overvoltage time Tv, integrated value SIin of overcurrent, and integrated value SIout of discharging current as parameters from a history of how battery 10 has been used, and control circuit 100 converts the parameters into battery ages YP, YT, YIin, and YIout, respectively. Note that each parameter (Pb, Tv, Min, SIout) stored in the memory (or storage unit 120) is updated to the latest value.

In S12, control circuit 100 determines whether at least one of battery ages YP, YT, YIin, and YIout has reached 20 years (the upper limit age).

If not (NO at S12), then, in S13, control circuit 100 does not cause display device 200 to display the diagnosis request message.

In contrast, if at least any of battery ages Ys has reached 20 years, (YES at S12), then, in S14, control circuit 100 causes display device 200 to display the diagnosis request message.

In S15, control circuit 100 determines whether two months (or the second period of time) has elapsed since displaying the diagnosis request message was started.

If so (YES at S15), then, in 818, control circuit 100 prohibits starting the system driving vehicle 5.

If two months (or the second period of time) has not been elapsed since displaying the diagnosis request message was started, (NO at S15), then, in S16, control circuit 100 determines whether one month (or the first period of time) has elapsed since displaying the diagnosis request message was started.

If so (YES at S16), then, in S17, control circuit 100 applies the Win/Wout limitation. If one month has not elapsed since displaying the diagnosis request message was started (NO at S16), the process ends.

Figure 18:
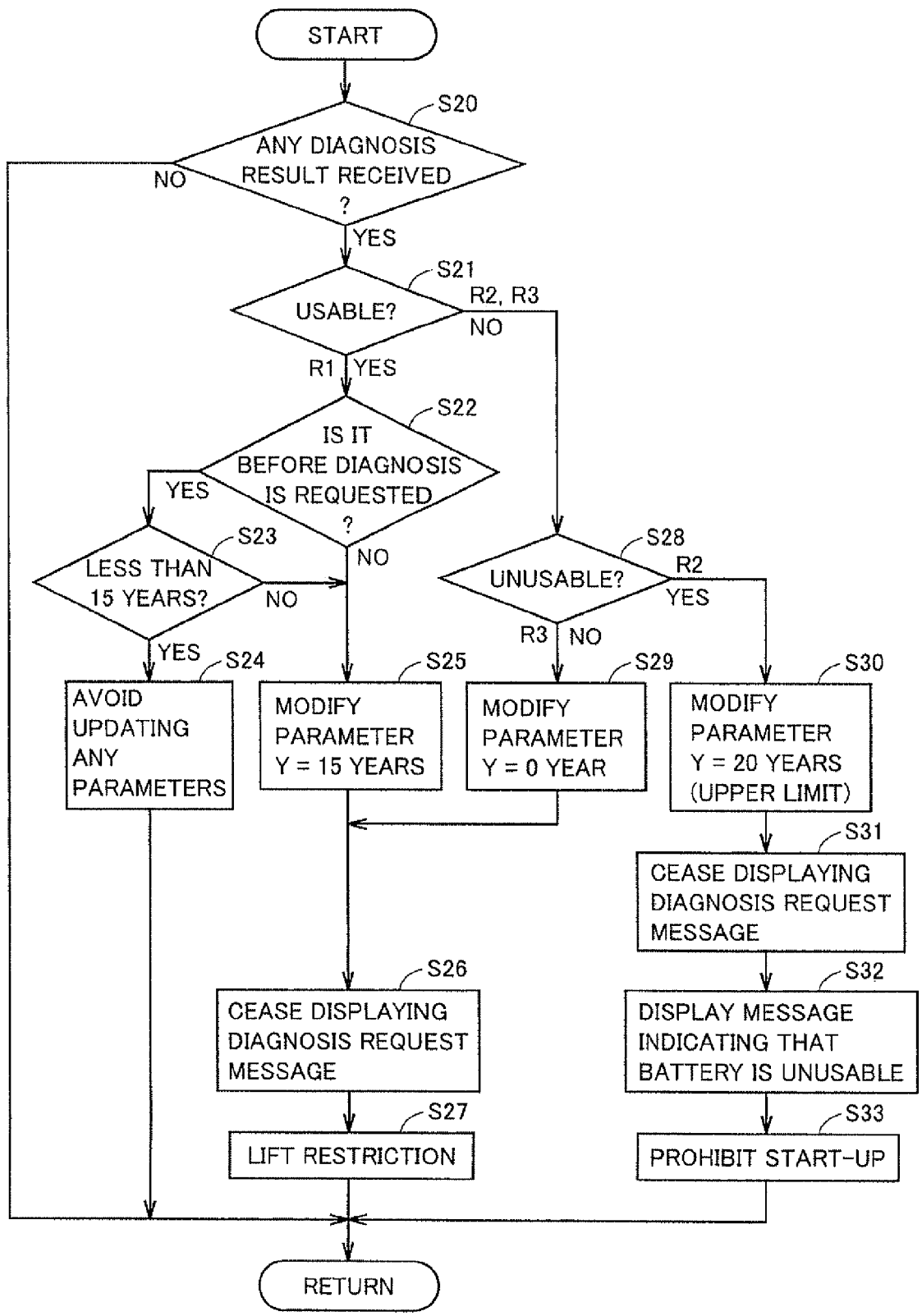
FIG. 18 is a second flowchart to represent a procedure of a process done by the control circuit.

FIG. 18 is a flowchart of a procedure of a process for mainly implementing a function of control circuit 100 involved in a process performed after the battery diagnosis.

In S20, control circuit 100 determines whether any battery diagnosis result (any of signals R1-R3) has been received from diagnostic device 300. If not (NO at S20), the process ends. If any battery diagnosis result is received (YES at S20), the control proceeds to S21.

In S21, control circuit 100 determines whether the diagnosis result indicates that the battery can continue to be used (or whether signal R1 is received from diagnostic device 300). If so (YES at S21), the control proceeds to S22. Otherwise (NO at S21), the control proceeds to S28.

In S22, control circuit 100 determines whether it is before a diagnosis request message is displayed. If so (YES at S22), the control proceeds to S23. If it is after a diagnosis request message has been displayed, (NO at S22), the control proceeds to S25.

In S23, control circuit 100 determines whether battery ages Ys are all less than 15 years. If so (YES at S23), the control proceeds to S24. If at least one of battery ages Ys is 15 years or greater (NO at S23), the control proceeds to S25.

In S24, control circuit 100 does not update each parameter stored in the memory and instead holds it as it is.

In S25, control circuit 100 updates each parameter in the memory so that each battery age Y is 15 years (or a predetermined age).

In S26, control circuit 100 ceases displaying the message (the diagnosis request message or the message indicating that the battery is unusable) displayed on display device 200.

In S27, control circuit 100 lifts restriction on the output of battery 10 (i.e., resolves the Win/Wout limitation or prohibition of starting the driving system).

In S28, control circuit 100 determines whether the diagnosis result indicates that the battery can no longer continue to be used (or whether signal R2 is received from diagnostic device 300). If the diagnosis result does not indicate that the battery can no longer continue to be used but that the battery is regarded as a new article (NO at S28), the control proceeds to S29. If the diagnosis result indicates that the battery can no longer continue to be used (YES at S28), the control proceeds to S30.

In S29, control circuit 100 initializes each parameter in the memory so that each battery age Y is 0 year. Thereafter the control proceeds to S26 and then to S27 to cease displaying the message displayed on display device 200 and also lift the restriction on the output of battery 10.

In S30, control circuit 100 updates each parameter in the memory so that each battery age Y is 20 years (or the upper limit age). Thereafter the control proceeds to S31 and then to S32 to cease displaying the diagnosis request message displayed on display device 200 and also cause display device 200 to display the message indicating that the battery is unusable. Furthermore, in S33, control circuit 100 prohibits starting the system driving vehicle 5.

Figure 19:
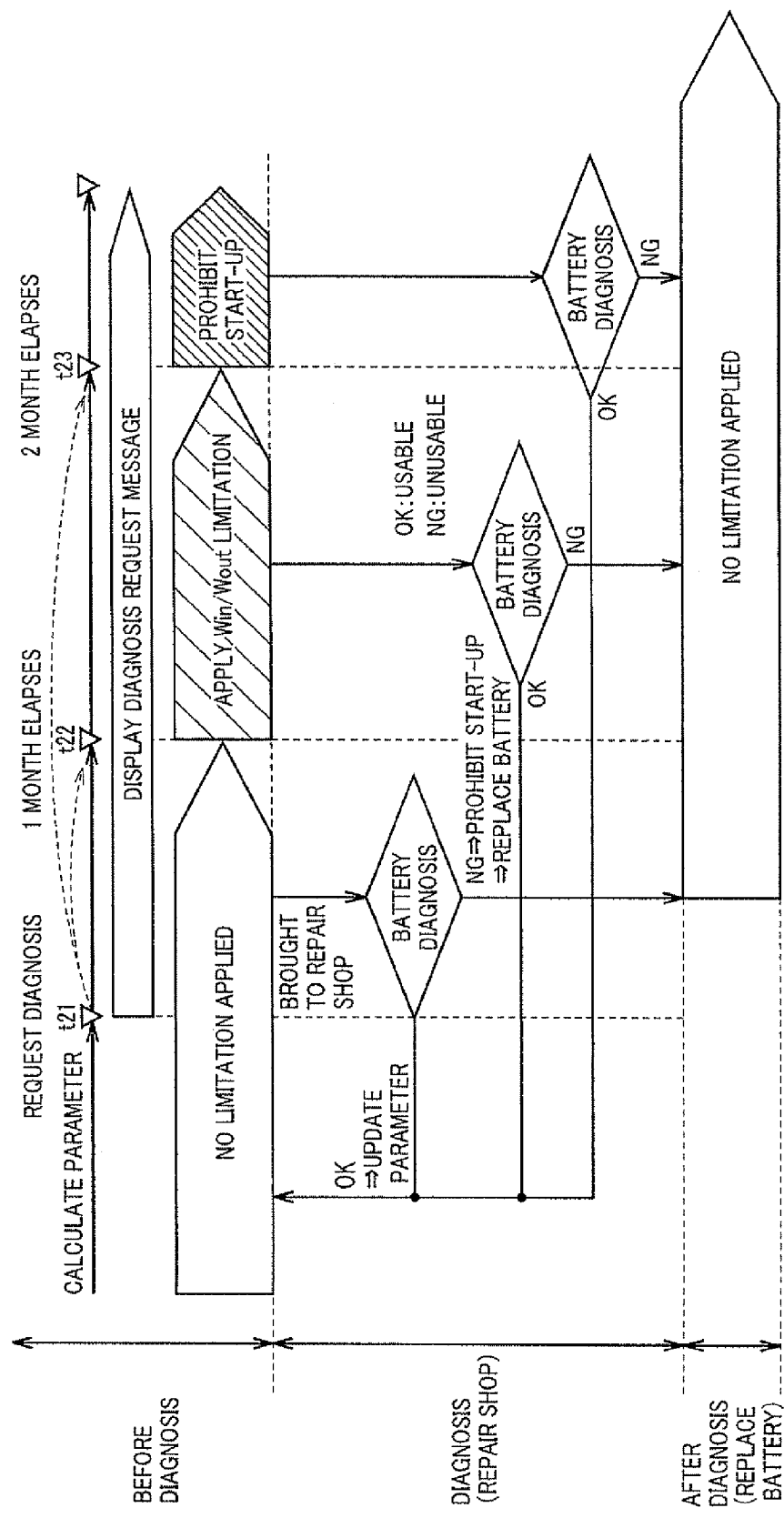
FIG. 19 is a diagram for illustrating a flow of a behavior of a vehicle controlled by the control circuit.

FIG. 19 is a diagram for illustrating a flow of a behavior of vehicle 5, as controlled by control circuit 100.

Initially, the behavior of vehicle 5 before the battery diagnosis will be described. Before the battery diagnosis, once any of battery ages Ys has reached 20 years, displaying a diagnosis request message starts (at time t21). Tire user can thus be informed that it is time to conduct a battery diagnosis.

Displaying the diagnosis request message has started, and thereafter one month elapses, and if still no diagnosis is conducted, then, the Win/Wout limitation starts (at time t22). This allows battery 10 to be charged with/discharge limited electric power and thus degrade more slowly.

After displaying the diagnosis request message has started and thereafter two months elapse, and if still no diagnosis is conducted, then, starting the system driving vehicle 5 is prohibited (at time t23). This substantially prohibits using battery 10 and minimizes/prevents continuing to use battery 10 in a degraded state.

Then will be described a behavior of vehicle 5 when the user who has noticed the diagnosis request message brings vehicle 5 to a repair shop and has the vehicle subjected to a battery diagnosis.

If the diagnosis result indicates that the battery can no longer continue to be used, starting the driving system is prohibited. In response to this diagnosis result, if battery 10 is replaced with a new article, display device 200 ceases displaying a message displayed thereon and starting the driving system is also no longer prohibited.

If the diagnosis result indicates that the battery can continue to be used, each parameter is updated so that each battery age Y is 15 years. Even if battery 10 is not replaced with a new article, display device 200 ceases displaying a message displayed thereon, and the Win/Wout limitation is also resolved or starting the driving system is also no longer prohibited. Furthermore, subsequent diagnosis request messages will be displayed whenever a period of five years elapses, and the user can be urged to conduct a battery diagnosis earlier than the initial period of 20 years.

Thus according to the present embodiment control circuit 100 allows a diagnosis request message to be displayed to urge the user to conduct a battery diagnosis when battery age Y (a value corresponding to an amount of lithium deposited as estimated) calculated based on a history of how battery 10 has been used reaches an upper limit age. Thereafter, a predetermined period of time elapses, and if then still no diagnosis is conducted, then, using battery 10 is restricted (or limited or prohibited). This can prevent battery 10 from failing as it continues to be used in a degraded state.

It should be understood that the embodiments disclosed herein are illustrative and non-restrictive in any respect. The scope of the present invention is defined by the terms of the claims, rather than the description above, and is intended to include any modifications within the scope and meaning equivalent to the terms of the claims.

REFERENCE SIGNS LIST

5: vehicle, 10: battery, 10#: battery cell, 11: battery block, 12: temperature sensor, 14: voltage sensor, 16: current sensor, 20: monitoring unit, 20a: voltage comparator circuit, 20b: overvoltage detection circuit, 20c: off counter, 22, 24: system main relay, 41, 42: motor generator, 50: engine, 60: power split device, 70: driving shaft, 80: wheel, 100: control circuit, 110: calculation unit, 111: first calculation unit, 112: second calculation unit, 113: third calculation unit, 114: fourth calculation unit, 120: storage unit, 130: determination unit, 140: display control unit, 150: electric power limiter unit, 160: start-up prohibition unit, 170: reception unit, 180: updating unit, 200: display device, 300: diagnostic device

The invention claimed is:

1. A device for controlling a rechargeable battery which can be subjected to a diagnosis of a degraded state by a diagnostic device, comprising:
   a determination unit that determines, from a history of how the rechargeable battery has been used, whether it is necessary to conduct said diagnosis;
   a warning unit that warns a user to subject the rechargeable battery to said diagnosis when said determination unit determines that it is necessary to conduct said diagnosis; and
   a restriction unit that restricts an output of the rechargeable battery if said warning unit warns the user to subject the rechargeable battery to said diagnosis and thereafter a predetermined period of time elapses, and despite that said diagnosis is still not conducted,
   wherein said determination unit determines whether it is necessary to conduct said diagnosis for each of a plurality of parameters including at least two of: a period for which the rechargeable battery is used; an integrated value of a period of time for which the rechargeable battery has voltage exceeding a reference value; an integrated value of a portion of a current charged to the rechargeable battery that exceeds a predetermined value; and an integrated value of a current discharged from the rechargeable battery.

2. The device for controlling the rechargeable battery according to claim 1, wherein said determination unit calculates a plurality of battery ages for said plurality of parameters, respectively, said battery age indicating an extent of how the rechargeable battery is degraded, and when at least one of said plurality of battery ages calculated reaches an upper limit age, said determination unit determines that it is necessary to conduct said diagnosis.

3. The device for controlling the rechargeable battery according to claim 2, further comprising a modification unit that modifies said battery age in accordance with a result of said diagnosis when said diagnosis is conducted.

4. The device for controlling the rechargeable battery according to claim 3, wherein if said result of said diagnosis indicates that the rechargeable battery can continue to be used, said modification unit returns said battery age that has reached said upper limit age to a predetermined age smaller than said upper limit age.

5. The device for controlling the rechargeable battery according to claim 4, wherein if said result of said diagnosis indicates that the rechargeable battery can continue to be used, said modification unit returns said battery age that has reached said upper limit age to said predetermined age, and said modification unit also sets at said predetermined age any other said battery age that has not reached said upper limit age.

6. The device for controlling the rechargeable battery according to claim 3, wherein if said result of said diagnosis indicates that the rechargeable battery can continue to be used, and when at least one of said plurality of battery ages is larger than a predetermined age smaller than said upper limit age, then said modification unit sets said plurality of battery ages at said predetermined age, whereas if said result of said diagnosis indicates that the rechargeable battery can continue to be used, and when said plurality of battery ages are all smaller than said predetermined age, then said modification unit does not modify said plurality of battery ages.

7. The device for controlling the rechargeable battery according to claim 3, wherein:
   when said result of said diagnosis indicates that the rechargeable battery can no longer continue to be used, said modification unit sets said plurality of battery ages at said upper limit age;
   when said result of said diagnosis indicates that the rechargeable battery can no longer continue to be used, said warning unit warns the user that the rechargeable battery cannot be used; and
   when said result of said diagnosis indicates that the rechargeable battery can no longer continue to be used, said restriction unit prohibits electrically charging and discharging the rechargeable battery.

8. A device for controlling a rechargeable battery which can be subjected to a diagnosis of a degraded state by a diagnostic device, comprising:
   a determination unit that determines, from a history of how the rechargeable battery has been used, whether it is necessary to conduct said diagnosis;
   a warning unit that warns a user to subject the rechargeable battery to said diagnosis when said determination unit determines that it is necessary to conduct said diagnosis; and
   a restriction unit that restricts an output of the rechargeable battery if said warning unit warns the user to subject the rechargeable battery to said diagnosis and thereafter a predetermined period of time elapses, and despite that said diagnosis is still not conducted,
   wherein said restriction unit restricts the output of the rechargeable battery by applying at least any one of a first control applied to decrease an upper limit value of electric power charged to the rechargeable battery and an upper limit value of electric power discharged from the rechargeable battery and a second control applied to prohibit electrically charging and discharging the rechargeable battery.

9. The device for controlling the rechargeable battery according to claim 8, wherein:
if said determination unit has determined that it is necessary to conduct said diagnosis and thereafter a first period of time elapses, and despite that said diagnosis is still not conducted, then, said restriction unit applies said first control; and
if said determination unit has determined that it is necessary to conduct said diagnosis and thereafter a second period of time longer than said first period of time elapses, and despite that said diagnosis is still not conducted, then, said restriction unit applies said second control.

10. A device for controlling a rechargeable battery which can be subjected to a diagnosis of a degraded state by a diagnostic device, comprising:
a determination unit that determines, from a history of how the rechargeable battery has been used, whether it is necessary to conduct said diagnosis;
a warning unit that warns a user to subject the rechargeable battery to said diagnosis when said determination unit determines that it is necessary to conduct said diagnosis;
a restriction unit that restricts an output of the rechargeable battery if said warning unit warns the user to subject the rechargeable battery to said diagnosis and thereafter a predetermined period of time elapses, and despite that said diagnosis is still not conducted;
a display device that displays information for the user; and
an electric power controller that controls electric power charged to and discharged from the rechargeable battery, wherein:
said warning unit warns the user to subject the rechargeable battery to said diagnosis by causing said display device to display a message to urge the user to subject the rechargeable battery to said diagnosis; and
said restriction unit restricts the output of the rechargeable battery by controlling said electric power controller.

11. A device for controlling a rechargeable battery which can be subjected to a diagnosis of a degraded state by a diagnostic device, comprising:
a determination unit that determines, from a history of how the rechargeable battery has been used, whether it is necessary to conduct said diagnosis;
a warning unit that warns a user to subject the rechargeable battery to said diagnosis when said determination unit determines that it is necessary to conduct said diagnosis; and
a restriction unit that restricts an output of the rechargeable battery if said warning unit warns the user to subject the rechargeable battery to said diagnosis and thereafter a predetermined period of time elapses, and despite that said diagnosis is still not conducted,
wherein said determination unit determines whether it is necessary to conduct said diagnosis, based on at least one parameter of: a period for which the rechargeable battery is used; an integrated value of a period of time for which the rechargeable battery has voltage exceeding a reference value; an integrated value of a portion of a current charged to the rechargeable battery that exceeds a predetermined value; and an integrated value of a current discharged from the rechargeable battery.

12. A method performed by a device for controlling a rechargeable battery which can be subjected to a diagnosis of a degraded state by a diagnostic device, comprising the steps of:
determining, from a history of how the rechargeable battery has been used, whether it is necessary to conduct said diagnosis;
warning a user to subject the rechargeable battery to said diagnosis when it is determined that it is necessary to conduct said diagnosis;
restricting an output of the rechargeable battery if the user has been warned to subject the rechargeable battery to said diagnosis and thereafter a predetermined period of time elapses, and despite that said diagnosis is still not conducted; and
determining whether it is necessary to conduct said diagnosis for each of a plurality of parameters including at least two of: a period for which the rechargeable battery is used; an integrated value of a period of time for which the rechargeable battery has voltage exceeding a reference value; an integrated value of a portion of a current charged to the rechargeable battery that exceeds a predetermined value; and an integrated value of a current discharged from the rechargeable battery.

13. A method performed by a device for controlling a rechargeable battery which can be subjected to a diagnosis of a degraded state by a diagnostic device, comprising the steps of:
determining, from a history of how the rechargeable battery has been used, whether it is necessary to conduct said diagnosis;
warning a user to subject the rechargeable battery to said diagnosis when it is determined that it is necessary to conduct said diagnosis;
restricting an output of the rechargeable battery if the user has been warned to subject the rechargeable battery to said diagnosis and thereafter a predetermined period of time elapses, and despite that said diagnosis is still not conducted; and
wherein the output of the rechargeable battery is restricted by applying at least any one of a first control applied to decrease an upper limit value of electric power charged to the rechargeable battery and an upper limit value of electric power discharged from the rechargeable battery and a second control applied to prohibit electrically charging and discharging the rechargeable battery.

14. A method performed by a device for controlling a rechargeable battery which can be subjected to a diagnosis of a degraded state by a diagnostic device, comprising the steps of:
determining, from a history of how the rechargeable battery has been used, whether it is necessary to conduct said diagnosis;
warning a user to subject the rechargeable battery to said diagnosis when it is determined that it is necessary to conduct said diagnosis;
restricting an output of the rechargeable battery if the user has been warned to subject the rechargeable battery to said diagnosis and thereafter a predetermined period of time elapses, and despite that said diagnosis is still not conducted;
displaying information for the user; and
controlling electric power charged to and discharged from the rechargeable battery, wherein:
the user is warned to subject the rechargeable battery to said diagnosis by causing said display device to display a message to urge the user to subject the rechargeable battery to said diagnosis; and the output of the rechargeable battery is restricted by controlling said electric power controller.

15. A method performed by a device for controlling a rechargeable battery which can be subjected to a diagnosis of a degraded state by a diagnostic device, comprising the steps of:

determining, from a history of how the rechargeable battery has been used, whether it is necessary to conduct said diagnosis;

warning a user to subject the rechargeable battery to said diagnosis when it is determined that it is necessary to conduct said diagnosis;

restricting an output of the rechargeable battery if the user has been warned to subject the rechargeable battery to said diagnosis and thereafter a predetermined period of time elapses, and despite that said diagnosis is still not conducted; and determining whether it is necessary to conduct said diagnosis, based on at least one parameter of: a period for which the rechargeable battery is used; an integrated value of a period of time for which the rechargeable battery has voltage exceeding a reference value; an integrated value of a portion of a current charged to the rechargeable battery that exceeds a predetermined value; and an integrated value of a current discharged from the rechargeable battery.

\* \* \* \* \*